(12) United States Patent
Altekar et al.

(10) Patent No.: US 7,123,651 B2
(45) Date of Patent: Oct. 17, 2006

(54) ADAPTABLE HYBRID AND SELECTION METHOD FOR ADSL MODEM DATA RATE IMPROVEMENT

(75) Inventors: Shirish A. Altekar, Los Gatos, CA (US); Jin-Der Wang, San Jose, CA (US); Louis Joseph Serrano, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 772 days.

(21) Appl. No.: 10/209,338

(22) Filed: Jul. 31, 2002

(65) Prior Publication Data

US 2004/0022308 A1  Feb. 5, 2004

(51) Int. Cl.
  *H04L 5/16*  (2006.01)
(52) U.S. Cl. ..................................... 375/222
(58) Field of Classification Search ................ 375/222, 375/240, 219, 259, 285; 370/32.1, 217
  See application file for complete search history.

(56) References Cited

U.S. PATENT DOCUMENTS

| | | | | |
|---|---|---|---|---|
| 3,088,667 A | * | 5/1963 | Kettler et al. .................. | 712/42 |
| 4,327,440 A | * | 4/1982 | Furuya et al. ............... | 375/317 |
| 4,633,046 A | * | 12/1986 | Kitayama et al. ........... | 370/291 |
| 5,007,047 A | * | 4/1991 | Sridhar et al. ............... | 370/286 |
| 5,164,985 A | * | 11/1992 | Nysen et al. ................ | 380/271 |
| 5,177,734 A | * | 1/1993 | Cummiskey et al. ........ | 370/290 |
| 5,265,151 A | * | 11/1993 | Goldstein ................. | 379/93.32 |
| 5,539,731 A | * | 7/1996 | Haneda et al. .............. | 370/286 |
| 6,044,108 A | * | 3/2000 | Bertness et al. ............ | 375/222 |
| 6,144,695 A | * | 11/2000 | Helms et al. ................ | 375/222 |
| 6,351,452 B1 | * | 2/2002 | Koenig et al. .............. | 370/217 |
| 6,654,410 B1 | * | 11/2003 | Tzannes ..................... | 375/222 |
| 6,674,810 B1 | * | 1/2004 | Cheng ........................ | 375/296 |
| 6,845,252 B1 | * | 1/2005 | Digiandomenico et al. . | 455/570 |
| 2001/0048667 A1 | * | 12/2001 | Hamdi ....................... | 370/252 |

OTHER PUBLICATIONS

"Transmission Systems and Media—Asymmetrical Digital Subscriber Line (ADSL) Transceivers", ITU-T, Draft G.992.1 (ex: G.dmt), Mar. 29, 1999, 240 pages.
"Silicon Laboratories Enters DSL Market with High-Performance Integrated ADSL Analog Front End", Published by Silicon Laboratories Inc., Austin, TX, May 21, 2001, 3 pages.

* cited by examiner

*Primary Examiner*—Kevin Burd
(74) *Attorney, Agent, or Firm*—Christopher P.Maiorana, P.C.

(57) ABSTRACT

A method of operating a modem generally comprising the steps of (A) transmitting an invalid signal from the modem at each of a plurality of settings for an echo cancelling hybrid of the modem, (B) calculating a plurality of merit values each in response to an echo signal received by the modem in response to the invalid signal, and (C) adjusting the echo cancelling hybrid to a particular setting of the settings determined from the merit values.

17 Claims, 5 Drawing Sheets

ADAPTABLE HYBRID AND SELECTION METHOD FOR ADSL MODEM DATA RATE IMPROVEMENT

FIELD OF THE INVENTION

The present invention relates to modems generally and, more particularly, to an adaptable hybrid and selection method for an asymmetric digital subscriber line modem to improve data rates.

BACKGROUND OF THE INVENTION

A frequency duplexed Asymmetric Digital Subscriber Line (ADSL) modem transmits in one frequency band and receives in a second, disjoint frequency band. In an "Annex A" mode, a Customer Premises Equipment (CPE) modem transmits from about 26 kilohertz (KHz) to 138 KHz in an upstream direction to a Central Office (CO) mode. The CO modem transmits from 138 KHz to 1104 KHz in a downstream direction to the CPE modem. Since the CPE transmits in a lower frequency band than the CPE receives, the CPE transmit circuit non-linearity and modulation of an upstream data signal on transmit carriers causes some frequency content of the CPE transmit signal to appear in the CPE receive band as echo signals. The echo signals acts as noise and an impediment to downstream data transmission.

Echo signals are conventionally reduced in several ways. First, the transmitted signal from the CPE modem is filtered to reduce energy in the frequencies that cause echo. Second, an analog circuit called an "echo cancelling hybrid", or "hybrid" for short, is used to measure and cancel the transmitted signal from the received signal. Finally, complicated adaptive techniques called echo cancellation can be used to suppress the echo further.

Some filtering will always be done. However, increasing the filtering degrades the upstream data rate because the filter will increase the phase loss in the pass band, making the upstream channel more difficult for the CO modem to equalize. Additional filtering also requires more electronic components, which can increase the manufacturing cost of the modems. Likewise, the hybrid circuit will always be used. However, because of the variation of phone lines, a non-programmable hybrid circuit design must sacrifice echo signal attenuation for robustness. Conversely, a hybrid optimized for a particular phone line without bridged taps may perform unacceptably for phone lines with moderate length bridged taps. Furthermore, required digital and analog hardware support used to implement the echo cancellation functions add to an expense and design complication for the modems.

SUMMARY OF THE INVENTION

The present invention concerns a method of operating a modem generally comprising the steps of (A) transmitting an invalid signal from the modem at each of a plurality of settings for an echo cancelling hybrid of the modem, (B) calculating a plurality of merit values each in response to an echo signal received by the modem in response to the invalid signal, and (C) adjusting the echo cancelling hybrid to a particular setting of the settings determined from the merit values.

The objects, features and advantages of the present invention include providing a rapid method for configuring an echo cancelling hybrid circuit that may provide (i) optimum echo cancellation, (ii) fast data rates, (iii) compliance with initialization time requirements, (iv) compliance with spectral mask requirements, (v) rapid determination of the optimum hybrid setting, and/or (vi) thorough training of the cancelling hybrid circuit.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
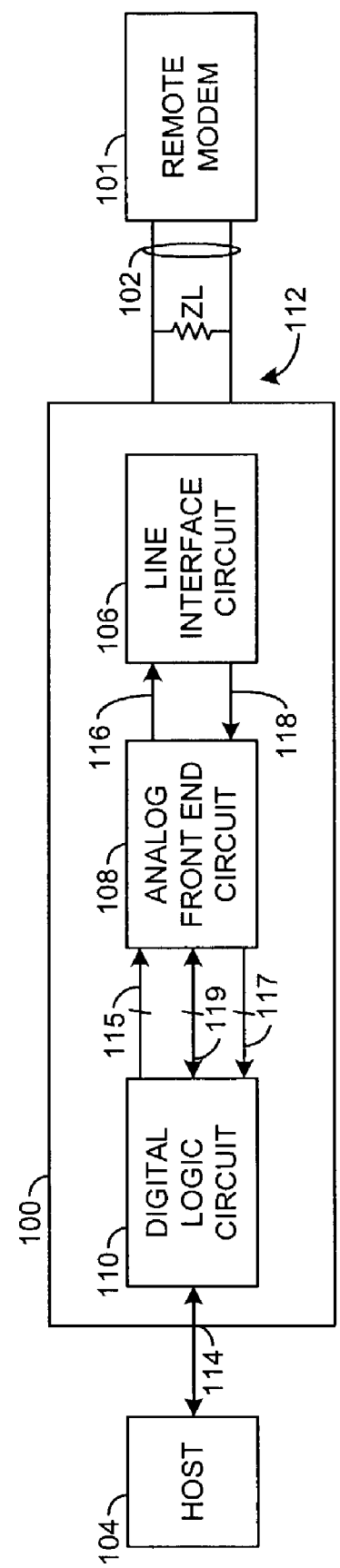
FIG. 1 is a block diagram of a modem in accordance with a preferred embodiment of the present invention.

Referring to FIG. 1, a block diagram of a modem 100 is shown in accordance with a preferred embodiment of the present invention. The invention generally reduces a deleterious effect of echo, or interference in a received signal from a transmitted signal at a modem that may reduce a receive data rate for the modem. The echo problem may arise because circuit non-linearity and/or data transmission in a transmit frequency band causes noise to appear in a receive frequency band. The present invention may be applied to a Customer Premises Equipment (CPE) modem and/or a Central Office (CO) modem.

The modem 100 may be connected to a remote modem 101 through a phone line 102 and connected to a host 104. In one embodiment, the modem 100 may operate as a Customer Premises Equipment (CPE) modem while the remote modem 101 operate as a Central Office (CO) modem. In another embodiment, the modem 100 may operate as the CO modem and the remote modem 101 may operate as the CPE modem.

The modem 100 generally comprises a line interface circuit 106, an analog front end circuit 108 and a digital logic circuit 110. An interface 112 may be provided between the modem 100 and the phone line 102. Another interface 114 may be provided between the modem 100 and the host 104. The digital logic circuit 110 generally provides for communications between the host 104 and the modem 100. The digital logic circuit 110 may communicate with the analog front end circuit 108 on a transmit interface 115, a receive interface 117, and a control and/or management interface 119. The analog front end circuit 108 generally provides for conversion between a digital domain of the digital logic circuit 110 and an analog domain of the phone line 102. The line interface circuit 106 generally provides for multiplexing and demultiplexing between the phone line 102 and (i) transmit interface 116 and (ii) a separate receive interface 118 of the analog front end circuit 108.

In one embodiment, the modem 100 may be designed as an Asymmetric Digital Subscriber Line (ADSL) modem using discrete multi-tone signals. In other embodiments, the modem 100 may be implemented as a Digital Subscriber Line modem, a High data rate Digital Subscriber Line (HDSL) modem, a Very high data rate Digital Subscriber Line (VDSL) modem, a G.Lite ADSL modem, or the like.

The modem 100 may be implemented in compliance with other modem standards, such as G.dmt.bis, to meet the design criteria of a particular application.

Figure 2:
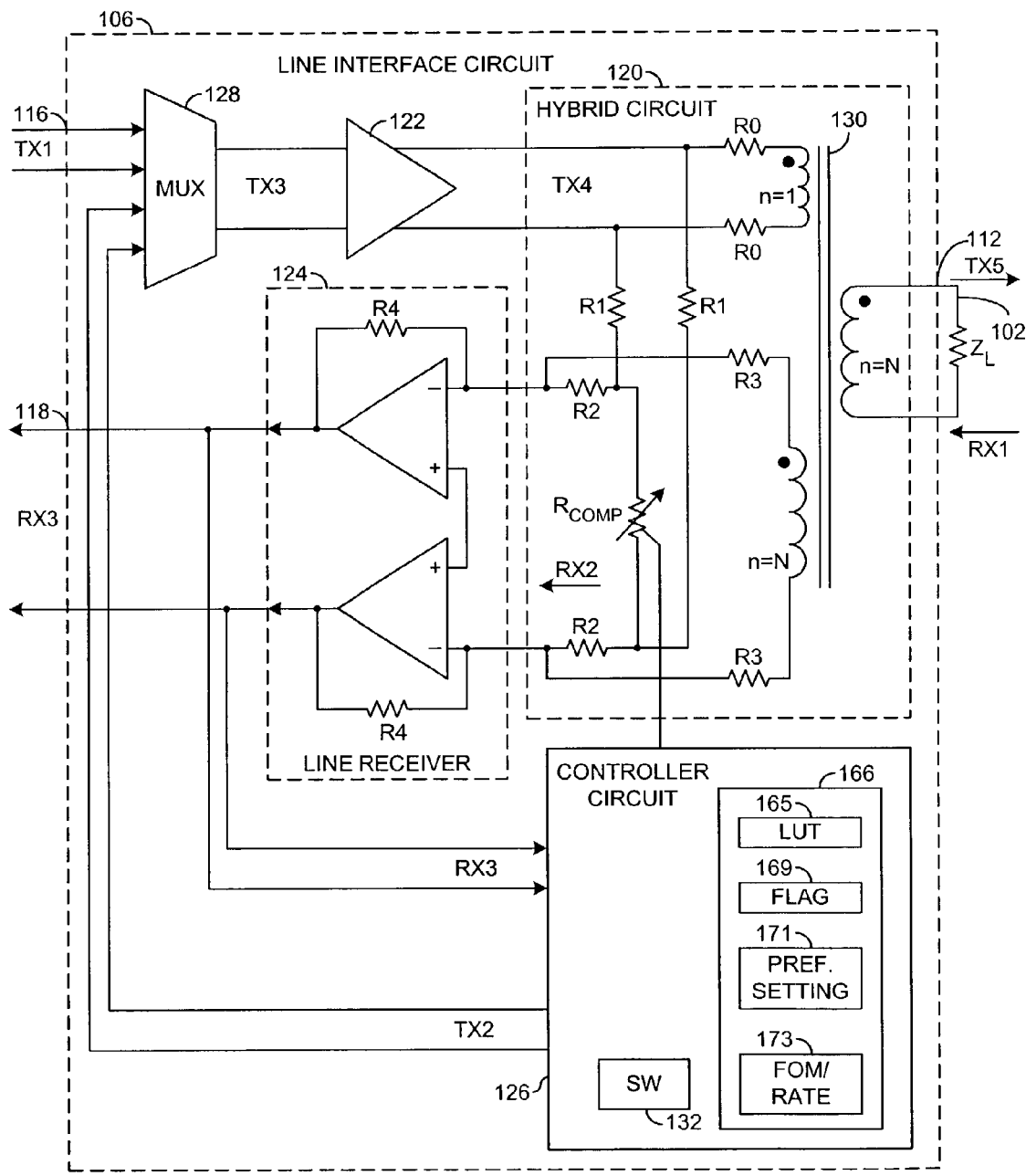
FIG. 2 is a block diagram of a line interface circuit.

Referring to FIG. 2, a block diagram of the line interface circuit 106 is shown. The line interface circuit 106 generally comprises an echo cancelling hybrid circuit 120, a line driver circuit 122, a line receiver circuit 124, a controller circuit 126, and a multiplexer circuit 128. The multiplexer circuit 128 may include the interface 116 to the analog front end circuit 108. The line receiver circuit 124 may include the interface 118 to the analog front end circuit 108. The hybrid circuit 120 may include the interface 112 to the phone line 102.

A signal (e.g., TX1) may be received by the multiplexer circuit 128 through the interface 116 from the analog front end circuit 108. The controller circuit 126 may generate and present a signal (e.g., TX2) to the multiplexer circuit 128. The multiplexer circuit 128 may multiplex one of the signals TX1 and TX2 to the line driver circuit 122 as another signal (e.g., TX3). Control of the multiplexing may be determined by the controller circuit 126. The line driver circuit 122 may buffer and amplify the signal TX3 to generate and present another signal (e.g., TX4) to the hybrid circuit 120. The hybrid circuit 120 may couple the signal TX4 to the phone line 102 as a transmitted signal (e.g., TX5). Each of the transmit signals TX1 through TX5 may be implemented as differential signals (as shown) and/or as single-ended signals.

The hybrid circuit 120 may receive a receive signal (e.g., RX1) from the phone line 102 through the interface 112. The hybrid circuit 120 may couple the signal RX1 to the line receive circuit 124 as another signal (e.g., RX2). The line receive circuit 124 may buffer and amplify the signal RX2 to generate and present a signal (e.g., RX3) to the analog front end circuit 118. Each of the receive signals RX1 through RX3 may be implemented as differential signals (as shown) and/or as single-ended signals.

Since the transmit signal TX5 and the receive signal RX1 may exist on the phone line 102 simultaneously, a portion of the transmit signal TX5 may be detected by the modem 100 as an echo in the receive signal RX1. Furthermore, a portion of the transmit signal TX4 may be coupled through the hybrid circuit 120 into the receive signal RX2. Therefore, hybrid is generally implemented as an analog circuit used to measure the transmitted signal TX4 and subtract a portion of the transmitted signal TX4 from the received signal RX1. The subtraction may eliminate the feedback from the signal TX4 and an echo from the transmit signal TX5, allowing for better signal quality and easier processing of the receive signal RX3.

A difficulty generally arises in that the received version of the transmitted signal TX4 may be filtered by a transformer 130 within the hybrid circuit 120 and a load (e.g., $Z_L$) of the phone line 102 itself. Consequently, achieving good cancellation of the transmitted signals TX4 and TX5 within the receive signal RX2 is generally difficult for a known, fixed value of the load $Z_L$, as the transmitted signal TX4 must be appropriately filtered. Cancellation generally becomes impractical for an arbitrary load $Z_L$ as a fixed cancellation approach may inevitably result in poor cancellation.

The hybrid circuit 120 generally comprises the transformer 130, a pair of resistors R0, a pair of resistors R1, a pair of resistors R2, a pair of resistors R3, and a variable resistor Rcomp. The resistors R0 may be connected between an output of the line driver circuit 122 and a first primary interface of the transformer 130 to provide proper impedance matching. The resistors R3 may connected between an input of the line receiver circuit 124 and a second primary interface of the transformer 130 to provide proper impedance matching. The resistors R1 and R2 may be connected between the output of the line driver circuit 122 and the input of the line receiver circuit 124 to establish a direct feedback path that couples an inverted portion of the transmit signal TX4 into the receive signal RX2. The compensation resistor Rcomp may be connected between junctions connecting each resistor R1 to one of the resistors R2.

Assuming that the resistor Rcomp may have a very high resistance or an open circuit, a cancellation may be attained when the resistor values R0 to R3 are picked according to Equation 1 as follows:

$$R_1 + R_2 = \frac{R_3(2R_0 + (2R_3\|Z_L)/N^2)}{(2R_3\|Z_L)/N} \qquad \text{Eq. (1)}$$

If the line load $Z_L$ may be known and purely resistive, cancellation of the transmit signal TX4 from the receive signal RX2 may be made exactly. However, the load impedance $Z_L$ is generally not known until installation of the modem 100. Further, the line load $Z_L$ is generally a complex value, so any choice of resistors R0 through R3 may be at best an approximation. Therefore, the modem 100 may be programmed or trained to account for the actual value of the line impedance $Z_L$.

Data rate limits of received data may be determined by a strength of the receive signal RX1 and noise contained therein. As the receive signal RX1 grows stronger, more data may be received per second. As the noise grows stronger, less data may be received per second. The relationship between the receive signal strength and the noise is generally quantitatively expressed by a signal to noise ratio (SNR). For an ADSL implementation, the SNR value may be determined for each tone of the discrete multiple tones.

From each SNR value, a number of bits that may be transmitted and received on a particular tone may be determined. The noise may be decomposed into three pieces, (i) line noise, (ii) echo, and (iii) equalization noise. Line noise is generally caused by such things as crosstalk, amplitude modulation ingress on the line 102, and circuit noise. Line noise may be measured while the remote modem 101 does not send a non-periodic time varying or random signal. Equalization noise generally arises from inter-symbol interference and/or inter-carrier interference when the equalization may not adequately compensate for a dispersion on the line 102. Finally, the echo generally arises from transmitting a signal or unwanted noise in a transmit frequency band that may affect the received signal RX1 in a receive frequency band. Even though ADSL may separate the transmit signal TX5 and receive signal RX1 in the frequency spectrum, transmit circuit non-linearity, transmitter thermal noise, and data modulation may produce frequency content in the receive frequency band and thus the receive signal RX1. As such, a purpose of the present invention may be to program or configure the hybrid circuit 120 to optimally cancel the transmit signals from the receive signals.

The resistance, or more generally impedance of the resistor Rcomp may be changed by opening or closing programmable switches (not shown). For example, one switch may cause an open circuit, effectively removing the resistor Rcomp from the hybrid circuit 120, while other switches may add parallel resistances, decreasing the value of Rcomp. The programming generally allows the hybrid circuit 120 to be changed by software 132 within the controller circuit 126, elsewhere in the modem 100, or the host 104. Changing the impedance of Rcomp may increase or decrease the echo. Other hybrid circuit configurations and/or other switchable components may be implemented to meet the design criteria of a particular application.

Figure 3:
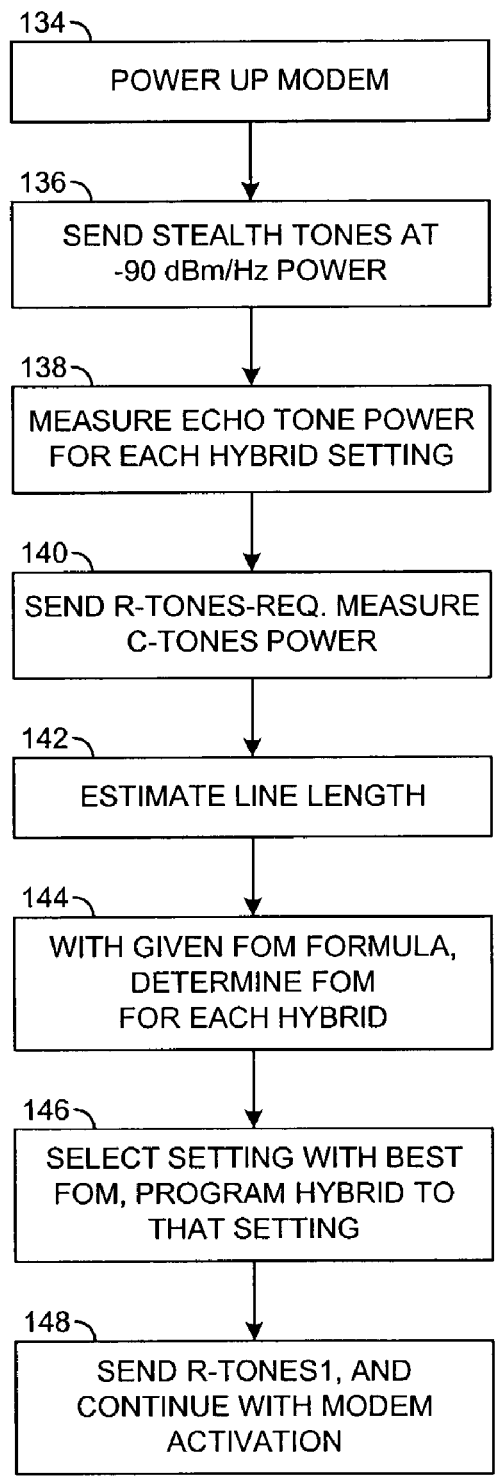
FIG. 3 is a flow diagram of a first example method for determining a hybrid setting.

Referring to FIG. 3, a flow diagram of a first example method for determining the hybrid setting is shown. The flow diagram uses terminology defined for an International Telecommunications Union (ITU) ADSL standard handshake. An American National Standards Institute (ANSI) ADSL standard handshake may be similarly performed with appropriate signal names substituted.

Determining an ideal setting for the modem 100 may begin at power up (e.g., block 134). A hybrid response arising from a known transmit signal TX2 may be used to determine a particular, best, or optimum setting for the resistor Rcomp and the hybrid circuit 120. The signal TX2 may be a set of tones outside a usual transmit band and broadcast at a low power level so as not to violate a predetermined spectral mask. The set of tones within the signal TX2 may be referred to as stealth tones or invalid tones. The stealth or invalid tones may be at the same frequencies as standard tones 39 to 150 (from a range of tone 0 to tone 255 separated by a regular 4312.5 hertz (Hz) spacing) and transmitted as pure sine waves with randomized phase to reduce the peak-average amplitude ratio. An output power for the stealth tones may be below −90 dBm/Hz that may be within a spectral mask for the full rate ADSL G.DMT standard. Other tone frequencies, waveforms and output power levels may be implemented to meet the design criteria of a particular application.

The stealth tones may be transmitted (e.g., block 136) and the resulting echos measured (e.g., block 138) while stepping through each hybrid setting. For each given hybrid setting, a received power may be measured for the tones of interest and stored for later use. The measurements may be performed relatively quickly to allow all measurements and complete initialization to be finished within a standard initialization time (e.g., less than one minute). After measuring the response from the stealth tones for each hybrid setting, an R-TONES-REQ signal may be sent and received handshake tones may be subsequently monitored (e.g., block 140). Upon detection of a C-TONES signal in the handshake tones, a power level of the C-TONES signal may be measured and used to determine an approximate distance from the remote modem 101 across the phone line 102 (e.g., block 142). The estimate may be combined with the measurements of the received stealth tone powers to estimate an expected impairment to the received data signals due to the echo for each different hybrid setting. Furthermore, a particular hybrid setting that may be expected to result in a lowest impairment or highest data rate is generally identified by the calculations. The hybrid circuit 120 may then be programmed to the particular setting (e.g., block 146) and modem initialization may continue to completion (e.g., block 148).

Ideally, the hybrid setting that allows the least impairment from the echo signals to enter the received signal is generally selected. In practice, an optimum setting may be difficult to achieve as the effect of the echo depends on the other noise and on the received signal. A figure of merit (FOM) value may therefore be calculated to determine the particular setting (e.g., block 144) actually used. In one embodiment, the FOM value may be a sum of the power of the received stealth tones from the lowest downstream tone to an upper downstream tone. The upper tone may be set depending upon the estimated distance to the remote modem 101. For example, where the remote modem 101 may be a long distance away (for example, greater than 18,000 feet), the upper tone may be limited to a standard tone 100. Where the remote modem 101 may be a short distance away (for example, 9000 feet or closer), the upper tone may be a standard tone 150). The upper tone limit may vary as a function of distance to the remote modem 101 between 9,000 feet and 18,000 feet. As stated above, the estimated distance to the remote modem 101 may be computed from the power of the received C-TONES signal.

The FOM value may be given defined according to Equation 2 as follows:

$$FOM = \sum_{i=L}^{i=U(x)} P(i) \qquad \text{Eq. (2)}$$

where:

L may be the lowest downstream tone;

U may be a function of x giving the upper tone to add to the FOM;

x may be the power of the downstream handshake tone 40 (in dBm); and

P(i) may the measured power (in dBm) of the stealth tone i (broadcast at 4312.5*i Hz for an ADSL compliant implementation).

The function U(x) may be defined by Equation 3 as follows:

$$U(x) = \begin{cases} 150 & x > -50 \\ \frac{50}{24} * (x + 74) + 100 & x < -50 \end{cases} \qquad \text{Eq. (3)}$$

The FOM value may be determined using power from all tones up to 150 where tone 40 may be measured at −50 dBm during handshake. The tones up to tone 100 may be used when x=−74 dBm.

In another embodiment, the echo power of each received tone may be weighted prior to integration. Weighting may be motivated by including information on the relative strength of the transmitted signal power. Incorporation of a weighting function W(i) into Equation 2 may result in Equation 4 as follows:

$$FOM = \sum_{i=L}^{i=U(x)} W(i) * P(i) \qquad \text{Eq. (4)}$$

where W(i) may be proportional to the power of the echo assuming a resistive (e.g., 100 ohm) load impedance $Z_L$ and no hybrid circuit 120. The lack of the hybrid circuit 120 generally means that W(i) may be proportional to the transmitted power on tone i. Once the integration limits have been determined, the power of the received echo may be integrated over the determined range for each hybrid setting. The hybrid setting with the smallest power may then be used to configure the hybrid circuit 120.

Figure 4:
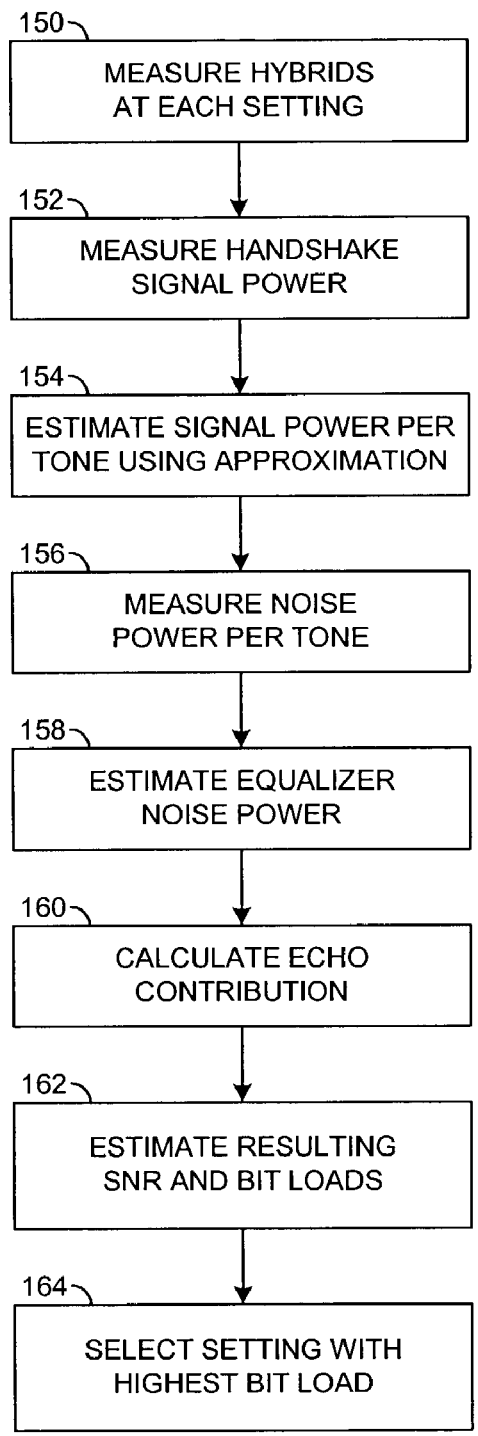
FIG. 4 is a flow diagram of a second example method for determining the hybrid setting.

Referring to FIG. 4, a flow diagram of a second example method for determining the hybrid setting is shown. In general, an estimate of the SNR for each tone may be a basis for setting the hybrid circuit 120. From the estimated SNR for each tone, an expected bit load or bit rate may be calculated. The setting with the highest estimated bit load may then be used to configure the hybrid circuit 120.

A method of determining the hybrid setting may begin by measuring the hybrid settings as described earlier using the stealth tones (e.g., block 150). The handshake power may be measured as described earlier (e.g., block 152). From the handshake power, an estimation may be made of a signal power per tone using an approximated response of the line 102 (e.g., block 154). A noise power per tone arising from the line 102 and circuits may be measured (e.g., block 156). From the signal power estimate, an equalizer noise power may be calculated (e.g., block 158). For each hybrid setting, a calculation may be performed to determine an echo contribution using an estimate of a transmit spectrum calculated earlier and the rejection by the hybrid circuit 120 inferred from the stealth tone power (e.g., block 160). For each hybrid, an estimate of the resulting SNR and bit loads may be performed (e.g., block 162). Finally, the setting among the possible hybrid settings estimating a highest bit load may be identified and applied to the hybrid circuit 120 (e.g., block 164).

The approximation of the line response generally predicts the signal power for a particular tone from the tone number and received power accurately for a line 102 with no taps. Where bridged taps are present in the line 102, a several dB error in the approximation may result. In practice, the approximation even with the several dB error is generally sufficiently accurate to determine a best setting for the hybrid circuit 120.

The noise power measurement may be performed upon detection of the C-TONES signal. The C-TONES signal generally comprises several constant sinusoids. Therefore, separation of the noise and the data signal by averaging may be simple to perform. The equalizer noise power generally depends on the received signal, since the received signal itself may be the source of the inter-symbol and the inter-carrier interference. The power may be approximated by scaling the received power per tone by a predetermined weight. The lower tones typically are 20–40 dB below the received signal power, while higher tones may be even less.

The stealth tones may have equal energy and thus the received power may represent a transfer function from the transmit signal to the echo signal. Furthermore, the spectral power of the transmitted signal may known a priori and any effects of circuit non-linearity may be included. Thus the measurement and knowledge of the transmit spectrum may be combined to estimate the power of the echo noise.

From the estimate of the signal strength and the power of the major noise components for each tone, forming the SNR may be easily performed. Relating the SNRs to the FOM values may be calculated using Equation 5 as follows:

$$FOM = \sum_k \log_2(1 + SNR_k) \qquad \text{Eq. (5)}$$

where k may be the discrete tone number. Consequently the bit load estimate may be determined for each hybrid setting by looking up a resulting bit load from a table 165 stored within controller circuit 126 or elsewhere in the modem 100. From the bit load values, the hybrid setting resulting in the highest bit load can be selected and programmed into the hybrid circuit 120.

In another embodiment, a training session may be used to determine the particular setting for the hybrid circuit 120 to determine the best cancellation operation. The training session may be either user initiated or automatically initiated. The training session generally tries each different hybrid setting, determines a final connection data rate at the current setting, and then "remembers" the best setting in terms of maximizing data rate across power cycles. Upon subsequent power ups, the controller circuit 126 may read the best setting from a nonvolatile memory 166 (FIG. 2) and initialize the modem 100 using the recalled setting with limited or without any additional training.

Figure 5:
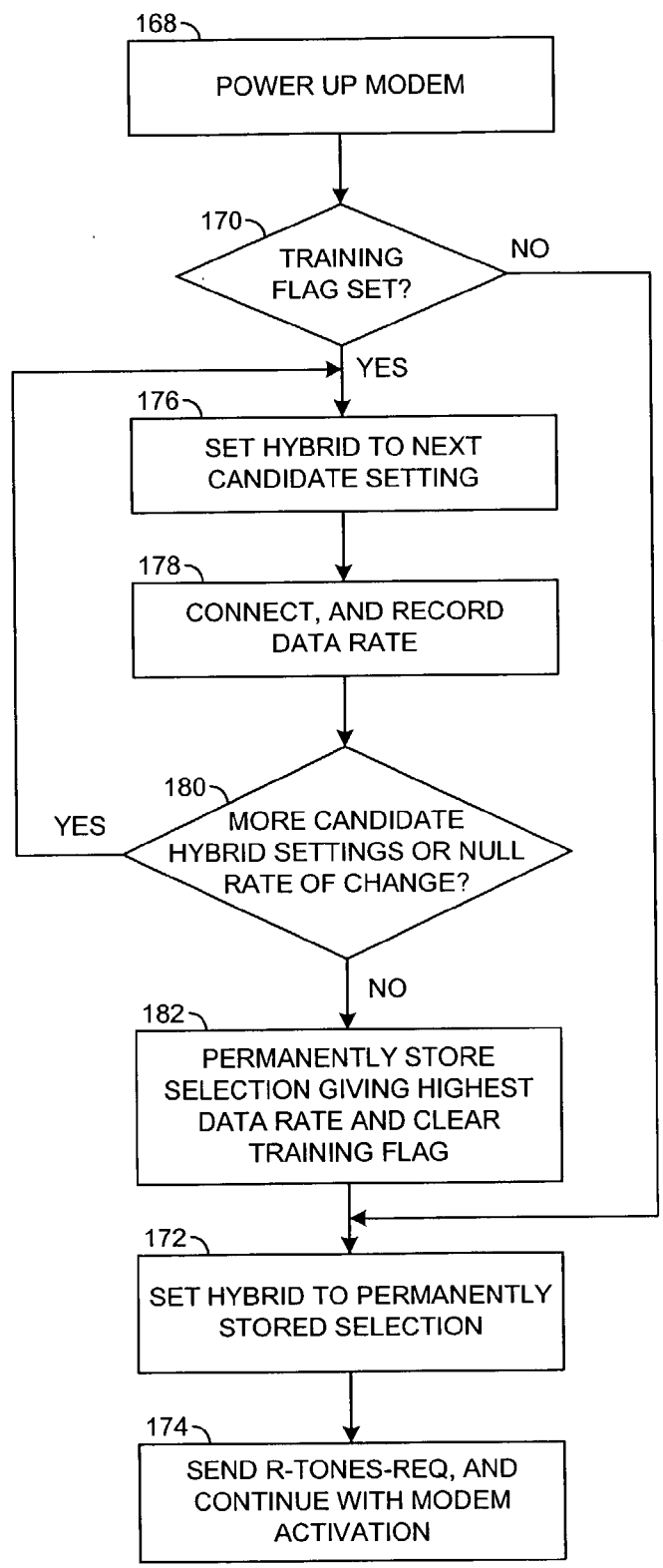
FIG. 5 is a flow diagram of a third example method for determining the hybrid setting.

Referring to FIG. 5, a flow diagram of a third example method for determining the hybrid setting is shown. The flow diagram uses terminology defined for an International Telecommunications Union (ITU) ADSL standard handshake. An American National Standards Institute (ANSI) ADSL standard handshake may be similarly performed with appropriate signal names substituted.

Upon power up (e.g., block 168), the modem 100 may determine if training may be needed by testing a training flag 169 stored in the nonvolatile memory 166 (e.g., decision block 170). When no training be needed (e.g., the NO branch from decision block 170), the modem 100 may recall from another location in the nonvolatile memory 166 the preferred setting 171 of the hybrid circuit 120 and set the hybrid circuit 120 accordingly (e.g., block 172). Initialization of the modem 100 may continue as usual by sending an R-TONES-REQ signal (e.g., block 174).

When the training flag may be set (e.g., the YES branch of decision block 170), the modem 100 may pick a first candidate hybrid setting (e.g., block 176) and initialize until the data rate may be determined and recorded (e.g., block 178). A check may be made for additional candidate hybrid settings or a null rate of change in (i) the previously recorded data rates and/or (ii) corresponding FOM values (e.g., decision block 180). If more candidate hybrid settings exist and/or the change rate is increasing or decreasing (e.g., the YES branch of decision block 180), the controller circuit 126 may step to a next candidate setting and restart the modem initialization (e.g., block 176) and continue through reconnecting and recording the resulting data rate (e.g., block 178). After all the candidate settings have been tried and/or the data rate/FOM value reach a peak as indicated by a null in the change rate (e.g., the NO branch of decision block 180), the particular setting 171 that yields the highest data rate may be stored in the nonvolatile memory 164 (e.g., block 182) and modem initialization begins again using the particular hybrid setting to completion. The FOM/data rate values 173 measured for each hybrid setting may also be stored in the nonvolatile memory 166 for later use.

The training flag 169 may be set by one or more events. For example, the training flag 169 may be set by a first mechanical switch on the modem 100, initiated by the modem software 132 if, for example, no training had been previously done on the modem 100, by a user request through a software command to the modem 100, a built-in self test function detecting a failure, a watchdog timer that has expired due to a lack of activity in the modem 100, a switch proximate the interface 112 signaling a disconnection from the phone line 102, and/or other similar means. The training flag 169 is generally cleared once a best hybrid setting has been selected and stored in the nonvolatile memory 166 (e.g., block 182).

As modems may be rarely moved and the loop rarely changes once the modem 100 has been installed, training generally needs to be done rarely, and consequently may represent a very small burden on the user. Usually, modem initialization may proceed with the optimal hybrid setting 171 with no need to try other candidate settings. In one embodiment, additional training may be performed for candidate settings proximate the current best setting. The data rates and/or FOM values for the various settings generally form a curve having a single peak. Once the peak has been found, later training may hunt around the last recorded peak for an updated peak data rate or peak FOM value. In another embodiment, bistable switches (not shown) may be used in the hybrid circuit 120 and therefore the best setting 171 may need not be stored in the nonvolatile memory 166 (e.g., block 182 may only clear the training flag 169).

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method of operating a modem, comprising the steps of:
   (A) transmitting an invalid signal from said modem a plurality of times, a respective one of said transmissions at each of a plurality of settings for an echo cancelling hybrid of said modem, wherein (i) said invalid signal is at a power level below that of a valid signal, (ii) said invalid signal comprises a plurality of test signals at discrete frequencies and (iii) each of said test signals is at a respective power level below a spectral mask defining said valid signal;
   (B) calculating a plurality of merit values, a respective one of said merit values for each echo signal received by said modem at a respective one of said settings, by integrating said echo signal at each of said respective settings over a predetermined frequency range;
   (C) determining an approximate distance to a remote transmitter; and
   (D) adjusting said echo cancelling hybrid to a particular setting of said settings as determined from both (i) said merit values and (ii) said approximate distance.

2. The method according to claim 1, further comprising the steps of:
   transmitting a request signal to said remote transmitter; and
   measuring a handshake signal from said remote transmitter responsive to said request signal to determined said approximate distance to said remote transmitter.

3. The method according to claim 2, wherein said step (B) comprises the sub-step of:
   calculating said merit values at each of said respective settings by integrating a product of said echo signal and a weighting function, wherein said weighting function varies for each of a plurality of tones in said invalid signal.

4. The method according to claim 2, further comprising the step of:
   calculating a signal to noise ratio for each of a plurality of discrete multi-tone frequencies in said invalid signal based on said handshake signal.

5. The method according to claim 4, further comprising the step of:
   calculating a bit rate for each of said settings in response to both (i) said signal to noise ratio and (ii) said merit value for each of said settings respectively, wherein said particular setting is determined by a highest bit rate so calculated.

6. The method according to claim 1, wherein the step of calculating said merit values at each of said respective settings is in further response to said approximate distance.

7. The method according to claim 6, wherein said step (B) comprises the sub-steps of:
   calculating a upper limit to a frequency range based on said approximate distance; and
   calculating said merit values at each of said respective settings by integrating said echo signal at each of said settings over said frequency range.

8. The method according to claim 1, wherein said particular setting corresponds to a fastest receivable data rate.

9. The method according to claim 1, further comprising the steps of:
   storing said particular setting through a power cycle;
   checking a training flag upon a power-up; and
   restoring said particular setting from storage if said training flag indicates that said particular setting was stored before said power cycle.

10. The method according to claim 1, further comprising the steps of:
    storing said merit values through a power cycle; and
    updating a training of said modem around a best among said merit values upon a power-up.

11. The method according to claim 1, further comprising the step of:
    setting a training flag upon detecting an event which indicates that a new training should be performed.

12. The method according to claim 11, wherein said event comprises at least one of (i) a user command, (ii) an initial installation and (iii) a failure.

13. The method according to claim 1, further comprising the step of:
    calculating a change rate for each neighboring pair of said merit values while stepping through said settings of said echo cancelling hybrid.

14. The method according to claim 13, further comprising the step of:
    terminating said stepping through said settings of said echo cancelling hybrid at a current setting among said settings in response to detecting a null in said change rate.

15. A modem comprising:
    means for echo cancellation;
    means for transmitting an invalid signal a plurality of times, a respective one of said transmissions at each of a plurality of settings for said echo cancelling hybrid, wherein (i) said invalid signal is at a power level below that of a valid signal, (ii) said invalid signal comprises a plurality of test signals at discrete frequencies and (iii) each of said test signals is at a respective power level below a spectral mask defining said valid signal; and
    means for (i) calculating a plurality of merit values, a respective one of said merit values for each echo signal received by said modem at a respective one of said settings, by integrating said echo signal at each of said respective settings over a predetermined frequency range to generate said merit values, (ii) determining an approximate distance to a remote transmitter and (iii) adjusting said echo cancelling hybrid to a particular setting of said settings as determined from both (a) said merit values and (b) said approximate distance.

16. A method of operating a modem, comprising the steps of:
(A) transmitting an invalid signal from said modem a plurality of times, a respective one of said transmissions at each of a plurality of settings for an echo cancelling hybrid of said modem, wherein (i) said invalid signal is at a power level below that of a valid signal, (ii) said invalid signal comprises a plurality of test signals at discrete frequencies and (iii) each of said test signals is at a respective power level below a spectral mask defining said valid signal;
(B) calculating a plurality of merit values, a respective one of said merit values for each echo signal received by said modem at a respective one of said settings;
(C) determining an approximate distance to a remote transmitter by (i) transmitting a request signal to said remote transmitter and (ii) measuring a handshake signal from said remote transmitter responsive to said request signal; and
(D) adjusting said echo cancelling hybrid to a particular setting of said settings as determined from both (i) said merit values and (ii) said approximate distance.

17. A method of operating a modem, comprising the steps of:
(A) transmitting an invalid signal from said modem a plurality of times, a respective one of said transmissions at each of a plurality of settings for an echo cancelling hybrid of said modem, wherein said invalid signal is at a power level below that of a valid signal;
(B) determining an approximate distance to a remote transmitter;
(C) calculating a plurality of merit values, a respective one of said merit values for each echo signal received by said modem at a respective one of said settings, by (i) calculating an upper limit to a frequency range based on said approximate distance and (ii) integrating said echo signal at each of said setting over said frequency range, wherein calculating said merit values at each of said respective settings is in response to said approximate distance; and
(D) adjusting said echo cancelling hybrid to a particular setting of said settings as determined from both (i) said merit values and (ii) said approximate distance.

* * * * *